(12) United States Patent
Blasko

(10) Patent No.: US 10,459,472 B2
(45) Date of Patent: Oct. 29, 2019

(54) MODEL PREDICTIVE CONTROL OPTIMIZATION FOR POWER ELECTRONICS

(71) Applicant: Hamilton Sundstrand Corporation, Charlotte, NC (US)

(72) Inventor: Vladimir Blasko, Avon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 518 days.

(21) Appl. No.: 14/961,030

(22) Filed: Dec. 7, 2015

(65) Prior Publication Data

US 2017/0160760 A1   Jun. 8, 2017

(51) Int. Cl.
*H02M 7/483* (2007.01)
*G05F 1/66* (2006.01)
*G05B 13/04* (2006.01)

(52) U.S. Cl.
CPC ............. *G05F 1/66* (2013.01); *G05B 13/048* (2013.01)

(58) Field of Classification Search
CPC ...................................... H02M 7/483
USPC ......................................... 318/812
See application file for complete search history.

(56) References Cited

U.S. PATENT DOCUMENTS

| | | | | |
|---|---|---|---|---|
| 9,047,076 | B1 * | 6/2015 | Lee | G06F 1/263 |
| 2005/0131620 | A1 * | 6/2005 | Bowyer | F02D 41/0007 |
| | | | | 701/108 |
| 2009/0033259 | A1 * | 2/2009 | Cesario | G05B 13/04 |
| | | | | 318/400.04 |
| 2010/0253269 | A1 * | 10/2010 | Papafotiou | H02P 23/30 |
| | | | | 318/400.26 |
| 2011/0181225 | A1 * | 7/2011 | Geyer | H02M 7/487 |
| | | | | 318/503 |
| 2013/0016549 | A1 * | 1/2013 | Kieferndorf | H02M 1/14 |
| | | | | 363/131 |

(Continued)

FOREIGN PATENT DOCUMENTS

| | | |
|---|---|---|
| EP | 2568591 A1 | 3/2013 |
| EP | 2725700 A1 | 4/2014 |

OTHER PUBLICATIONS

J. Rodriguez, et al., Predictive Control of Power Converters and Electrical Drives, John Wiley and Sons, Ltd., IEEE Apr. 2012, 18 pages.

*Primary Examiner* — Min Huang
(74) *Attorney, Agent, or Firm* — Cantor Colburn LLP

(57) ABSTRACT

Embodiments are directed to a model predictive control for power electronics. The model predictive control includes a plurality of switching matrices defining potential states of a plurality of power converter switches of a multi-level power converter and a control. The control is configured to select a current switching matrix from the switching matrices that models the multi-level power converter in a current state. The control determines a targeted switching matrix from the switching matrices that best aligns with a targeted state based on alignment with a multi-objective function and changes with respect to the current state. The control adjusts a switch state of the power converter switches based on the targeted switching matrix. The control sets the current switching matrix to the targeted switching matrix and monitoring for changes with respect to the multi-objective function and the current state.

16 Claims, 7 Drawing Sheets

(56) References Cited

U.S. PATENT DOCUMENTS

| | | | |
|---|---|---|---|
| 2014/0118063 A1* | 5/2014 | Briffa | H03F 1/32 330/124 R |
| 2015/0023196 A1* | 1/2015 | Schlenk | G06F 11/3006 370/252 |
| 2015/0229233 A1* | 8/2015 | Quevedo | H02P 27/12 318/812 |
| 2015/0381187 A1* | 12/2015 | Ahmed | H02J 3/01 327/156 |
| 2016/0149507 A1* | 5/2016 | Lei | H02M 7/487 363/35 |
| 2016/0161561 A1* | 6/2016 | Chen | G01R 31/34 702/182 |
| 2016/0314230 A1* | 10/2016 | Dufour | G06F 17/5036 |

* cited by examiner

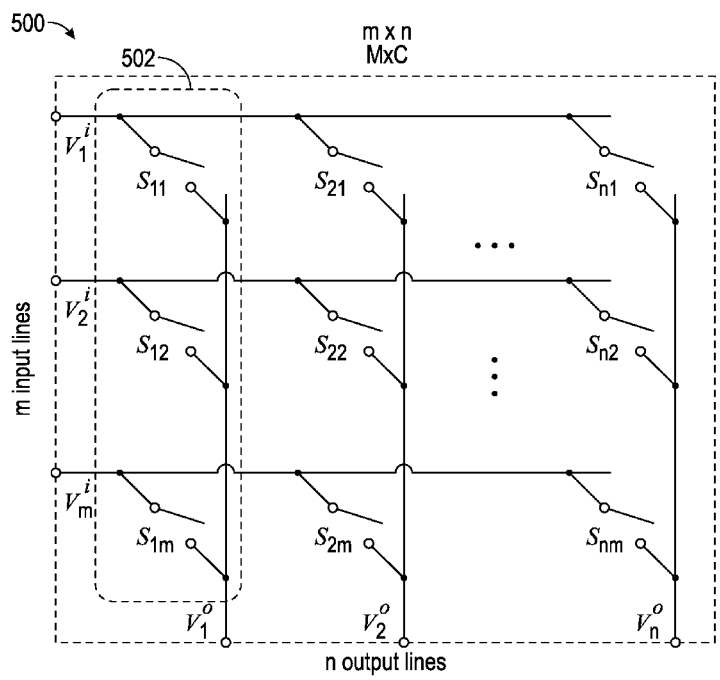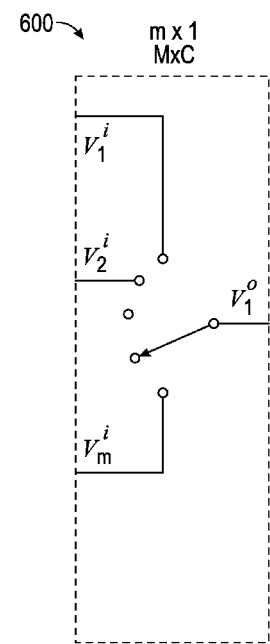
FIG. 5
FIG. 6

MODEL PREDICTIVE CONTROL OPTIMIZATION FOR POWER ELECTRONICS

BACKGROUND OF THE DISCLOSURE

The present disclosure relates generally to electric power converter control. More specifically, the present disclosure relates to optimization of model predictive control for power electronics equipment.

Several approaches exist for controlling power converters in power electronics and electrical drives. Conventional controls use proportional-integral (PI) control to minimize an error signal and associated control objectives (e.g., overshoot, transient response, etc.) as dominant criteria. The PI control typically monitors a control parameter, such as an electrical current or voltage of a plant that includes a load and/or source and one or more switching elements. The PI control tracks a difference in the monitor control parameter versus a commanded control parameter, applies a transfer function, and uses a switch control, such as timing adjustments for pulse width modulation, to adjust switch timing such that the monitored control parameter tracks to the commanded control parameter. Other approaches for power converter control attempt to monitor multiple control parameters simultaneously; however, more advanced control algorithms can be challenging to implement due to computational demands and switch timing constraints to maintain closed-loop performance.

BRIEF DESCRIPTION OF THE DISCLOSURE

Embodiments are directed to a model predictive control for power electronics. The model predictive control includes a plurality of switching matrices defining potential states of a plurality of power converter switches of a multi-level power converter and a control. The control is configured to select a current switching matrix from the switching matrices that models the multi-level power converter in a current state. The control determines a targeted switching matrix from the switching matrices that best aligns with a targeted state based on alignment with a multi-objective function and changes with respect to the current state. The control adjusts a switch state of the power converter switches based on the targeted switching matrix. The control sets the current switching matrix to the targeted switching matrix and monitors for changes with respect to the multi-objective function and the current state.

A method of generating switching matrices for a multi-level power converter includes determining, by a switching matrix generator, a number of phases and levels in the multi-level power converter based on a number of input lines and output lines of the multi-level power converter. A switch position is defined between each of the input lines and each of the output lines. A switching matrix for the multi-level power converter is populated with each combination of switching state of power converter switches at each switch position that allows a maximum of one switch input leg to establish a conductive path with a single output line.

A method of model predictive control for power electronics includes selecting a current switching matrix from a plurality of switching matrices, where the current switching matrix models a multi-level power converter in a current state and the switching matrices define potential states of a plurality of power converter switches of the multi-level power converter. A targeted switching matrix from the switching matrices is determined that best aligns with a targeted state based on alignment with a multi-objective function and changes with respect to the current state. A switch state of the power converter switches is adjusted based on the targeted switching matrix. The current switching matrix is set to the targeted switching matrix and monitoring for changes is performed with respect to the multi-objective function and the current state.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 5 depicts a universal matrix converter topology according to an embodiment;

FIG. 6 depicts an equivalent of a single leg converter as a multiple position switch according to an embodiment;

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION OF THE DISCLOSURE

Turning now to an overview of the present disclosure, embodiments are directed to a universal m*n power converter and model suitable for any multi-level converter with an arbitrary number of AC or DC input lines (m) or output lines (n). The switching states that drive a power section are selected by minimization of a cost function that searches through available states. Modifications to a switching state matrix can support bi-directional switches and unidirectional switching devices, where conduction depends on current/voltage polarity, e.g., diodes. The control may be applied to any type of DC/DC, DC/AC, AC/DC or AC/AC power converter with an arbitrary number of inputs and outputs. The control can also support Vienna converters that combine switching devices (e.g., transistors) with semiconductor valves/diodes. A multi-objective cost function can include terms for quality of current tracking, minimization of switching frequency, balancing of DC bus voltage, reactive power minimization, power structure losses minimization, etc. The multi-objective cost function can enable penalization of individual switches and perform effective DC link voltage balancing in multi-level power converters. Although embodiments are described in terms of 2-level, 3-level T, and Vienna converters, it will be understood that a wide variety of known multi-level power converter topologies can be implemented using the control and modeling features as detailed herein.

Embodiments can be used to optimize model predictive control (MPC) using switching state matrices. Generally, MPC can select a control vector to be applied to a load, based on optimization of a cost function. A multi-objective optimization function can have a reference vector x* and a predicted feedback/system response over a selected time horizon and other constraints and other objectives of the system included.

Figure 1:
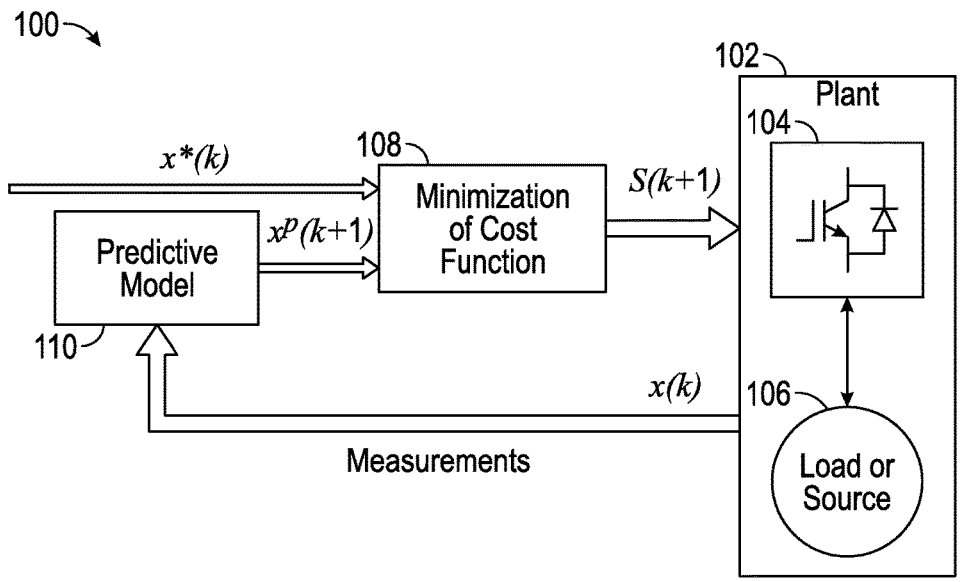
FIG. 1 depicts a block diagram of a model predictive control according to an embodiment.

Turning now to a more detailed description of the drawings, FIG. 1 depicts a general example of a block diagram for a power converter plant system 100 using MPC. A plant 102 includes a plurality of switches 104 that control voltage/current with respect to a load or source 106. A reference vector x* is provided to a minimization of cost function 108. Measurements x from the plant 102 can provide a predictive model 110 with data to predict a future state $x^p$, where the future state $x^p$ is provided to the minimization of cost function 108. The minimization of cost function 108 applies constraints to the reference vector x* and future state $x^p$ to generate a next switch state S for the switches 104 to achieve control objectives of the MPC. Control objectives may be achieved through selective weighting and minimizing changes in switch states between iterations to meet current/voltage demands of the load or source 106. Switch states can be tracked and selected based on switching matrices defined according to a power converter topology implemented using the switches 104.

Figure 2:
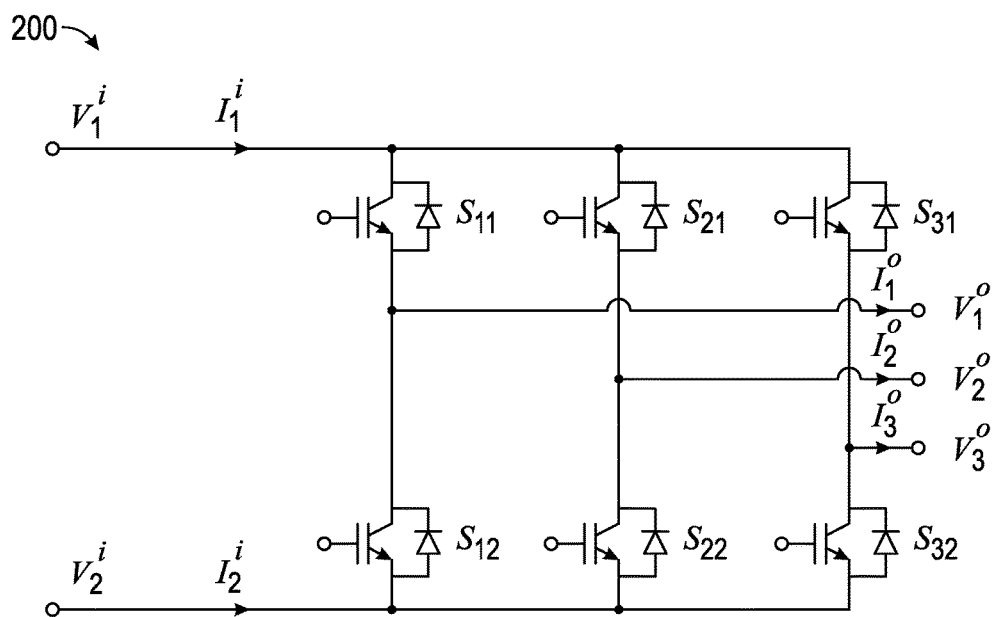
FIG. 2 depicts a two-level power converter topology according to an embodiment.
Figure 3:
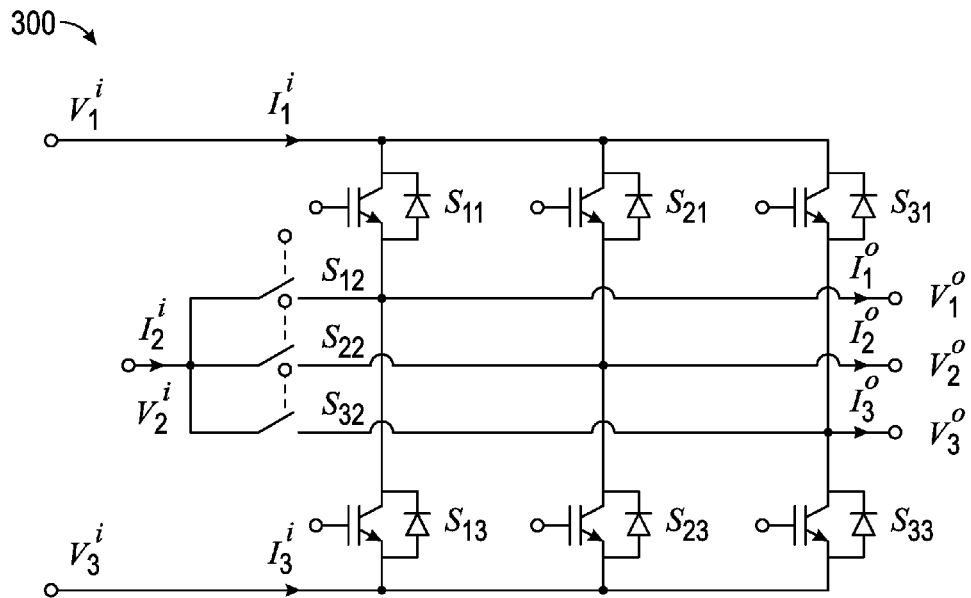
FIG. 3 depicts a three-level T power converter topology according to an embodiment.
Figure 4:
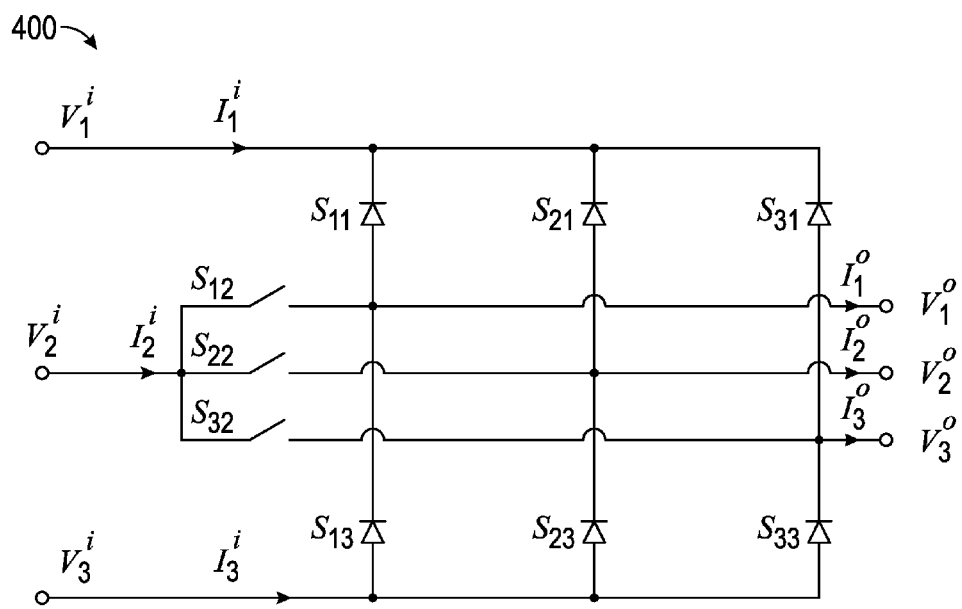
FIG. 4 depicts a Vienna converter topology according to an embodiment.

FIGS. 2-4 depict examples of various multi-level power converter topologies. FIG. 2 depicts a two-level power converter topology 200, FIG. 3 depicts a three-level T power converter topology 300, and FIG. 4 depicts a Vienna converter topology 400 according to embodiments. In each of the examples of FIGS. 2-4, using pulse width modulation (PWM), output voltages can be created by combining (or switching between) input voltages. Input and output voltage potentials V are marked with superscripts "i" and "o" respectfully in FIGS. 2-4. Power devices $S_{i,j}$ in FIGS. 2-4 are diodes and transistors. The first index i assigns the output and the second index j assigns input lines to which the devices are connected. Transistors conduct current from the top (collector) to the bottom (emitter) terminal in the direction of the arrow on bottom (emitter) terminal if a gating signal is present on the gate (middle terminal) in FIGS. 2 and 3. The presence of a gating signal is indicated by assigning the value of "1" to the gate signal. When a gate signal is "0", the transistor does not conduct. Diodes conduct in the direction from cathode to anode as pointed with its arrow like symbol. If voltage or current on the transistor or diode in a circuit is not compatible with this notation, the device will not conduct. Based on these conventions, the diodes and transistors (or a unit consisting of a combination of a diode and a transistor) in FIGS. 2-4 can be replaced with switches that are controlled by gating pulses to enable their conduction under the same conditions that would lead to their conduction as with original topologies in FIGS. 2-4.

The topologies 200-400 of FIGS. 2-4 can be replaced by a universal matrix converter (MxC) topology 500 as shown in FIG. 5. In the example of FIG. 5, the input lines m and output lines n are interchangeable. Two constraints related to switching of the devices in FIG. 5 should be satisfied:

Constraint 1: Simultaneous conduction of switches connecting input legs to a particular output leg is not allowed, meaning $$\prod_{j}^{n} S_{i,j} = 0; i = 1, \ldots n \quad \text{(Equation 1)}$$

Constraint 2: One of the switches connecting input legs to a particular output leg should be conducting if there is current in the output leg through an inductive load, meaning $$\sum_{j=1}^{n} S_{i,j} = 1; i = 1, \ldots n \quad \text{(Equation 2)}$$

By inspection of the schematic of MxC in FIG. 6 input/output voltage equations of the MxC topology 500 can be derived as:

$$\begin{bmatrix} V_1^o \\ V_2^o \\ \vdots \\ V_n^o \end{bmatrix} = \begin{bmatrix} S_{11} & S_{12} & . & S_{1m} \\ S_{21} & S_{22} & . & S_{2m} \\ . & . & . & . \\ S_{n1} & S_{n2} & & S_{nm} \end{bmatrix} \begin{bmatrix} V_1^i \\ V_2^i \\ \vdots \\ V_m^i \end{bmatrix} \quad \text{(Equation 3)}$$

or in a more compact notation $$V^o = S V^i \quad \text{(Equation 3a)}$$

Note that switches in column 502 in FIG. 5 are mapped into first row of the matrix in Equation 3. Assuming ideal switches without losses and using the law of conservation of energy between input and output of the converter, an equation of a relationship between input and output currents follows:

$$I^o = S^T I^i \quad \text{(Equation 4)}$$

Equations (1)-(4) constitute mathematical model of the MxC topology 500.

Figure 12:
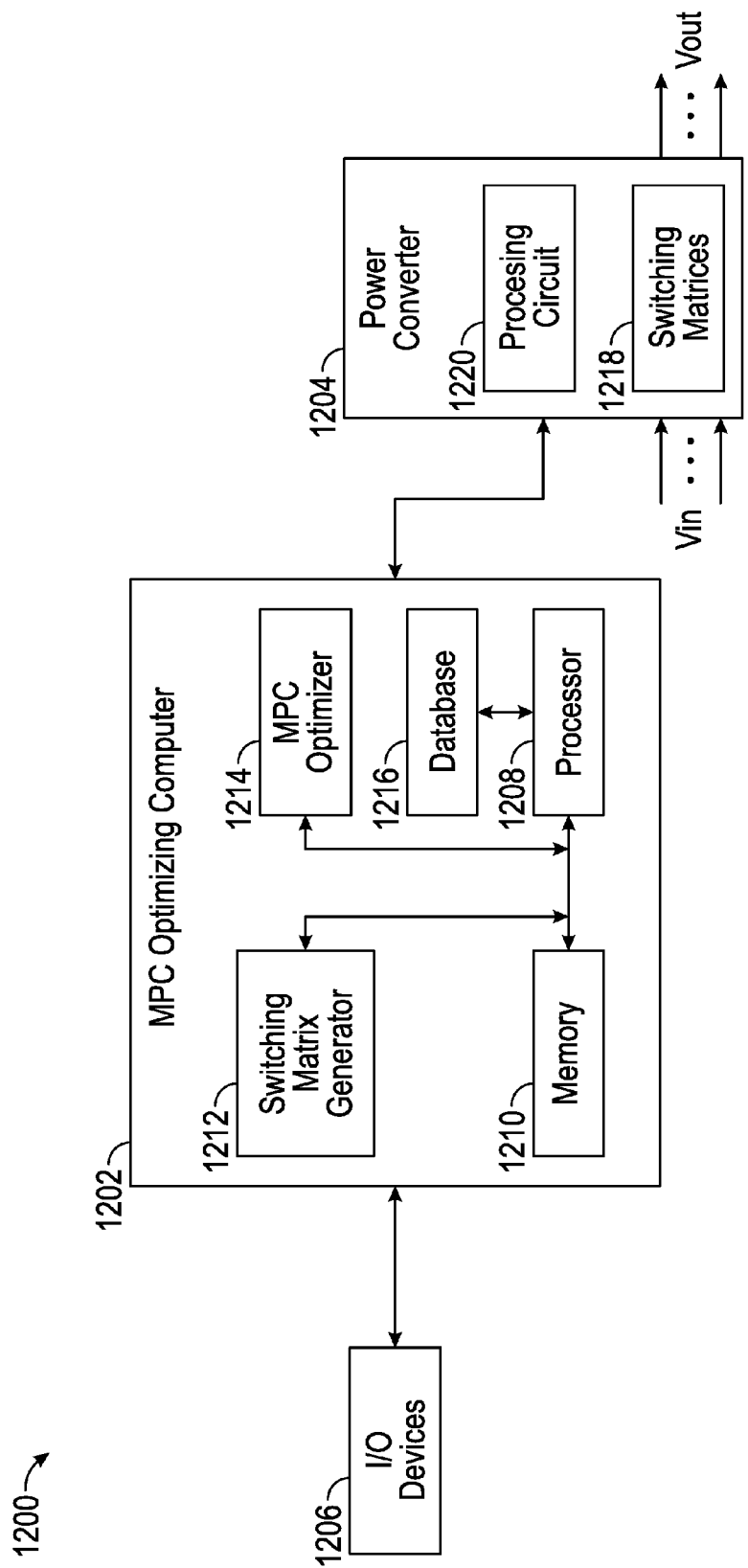
FIG. 12 depicts a system for model predictive control optimization according to an embodiment.

Generation of the switching matrix in Equation 3 can be performed by a computer system (e.g., FIG. 12). It is visible by inspection that every column of switches in FIG. 5 is connected by one output line correspond to the one (horizontal) row in switching matrix of Equation 3. To satisfy constraints one and two, each row should have only one "1" at a time and remaining elements should be "0". For a converter with m input lines, the allowable states to fill rows in S matrix are therefore from the set:

$$\{R_1, R_2, \ldots R_m\}, R_1 = [0,0, \ldots 0,1], R_2 = [0 \ldots 0,1, 0], \ldots R_m = [1,0, \ldots 0]$$

Each row in matrix S will define switching states that create a voltage vector for one output phase. Thus, the number of rows will correspond to the number of output phases/lines n.

Generation of a switching state matrix S is illustrated below for a 3-phase for 2-level converter namely for m*n=2*3 converter (m=2 input lines and n=3 output lines). Such a converter will have in switching matrix row elements $R_x$, where x=1,2 from the set:

$\{R_1, R_2\}, R_1=[0,1], R_2=[1,0]$

The switch matrix is shown in Table 1 (OLx is output line, x=1, . . . 3 is line designator/number):

TABLE 1

Creation of switching state matrix for 2 * 3 converter

| State | OL1 | OL2 | OL3 |
|---|---|---|---|
| 1 | $R_1$ | $R_1$ | $R_1$ |
| 3 | $R_1$ | $R_1$ | $R_2$ |
| 3 | $R_1$ | $R_2$ | $R_1$ |
| 4 | $R_1$ | $R_2$ | $R_2$ |
| 5 | $R_2$ | $R_1$ | $R_1$ |
| 6 | $R_2$ | $R_1$ | $R_2$ |
| 7 | $R_2$ | $R_2$ | $R_1$ |
| 8 | $R_2$ | $R_2$ | $R_2$ |

Generation of a switching state matrix S for a 3-phase for 3-level converter namely for m*n=3*3 converter (m=3 input lines and n=3 output lines) is shown below. Such a converter will have in switching matrix row elements Rx from the set:

$\{R_1, R_2, R_3\}, R_1=[0, 0, 1], R_2=[0, 1, 0], R_3=[1, 0, 0]$

The switch matrix will be

TABLE 2

Creation of switching state matrix for 3 * 3 converter

| State | OL1 | OL2 | OL3 |
|---|---|---|---|
| 1 | $R_1$ | $R_1$ | $R_1$ |
| 2 | $R_1$ | $R_1$ | $R_2$ |
| 3 | $R_1$ | $R_1$ | $R_3$ |
| 4 | $R_1$ | $R_2$ | $R_1$ |
| 5 | $R_1$ | $R_2$ | $R_2$ |
| 6 | $R_1$ | $R_2$ | $R_3$ |
| 7 | $R_1$ | $R_3$ | $R_1$ |
| 8 | $R_1$ | $R_3$ | $R_2$ |
| 9 | $R_1$ | $R_3$ | $R_3$ |
| 10 | $R_2$ | $R_1$ | $R_1$ |
| 11 | $R_2$ | $R_1$ | $R_2$ |
| 12 | $R_2$ | $R_1$ | $R_3$ |
| 13 | $R_2$ | $R_2$ | $R_1$ |
| 14 | $R_2$ | $R_2$ | $R_2$ |
| 15 | $R_2$ | $R_2$ | $R_3$ |
| 16 | $R_2$ | $R_3$ | $R_1$ |
| 17 | $R_2$ | $R_3$ | $R_2$ |
| 18 | $R_2$ | $R_3$ | $R_3$ |
| 19 | $R_3$ | $R_1$ | $R_1$ |
| 20 | $R_3$ | $R_1$ | $R_2$ |
| 21 | $R_3$ | $R_1$ | $R_3$ |
| 22 | $R_3$ | $R_2$ | $R_1$ |
| 23 | $R_3$ | $R_2$ | $R_2$ |
| 24 | $R_3$ | $R_2$ | $R_3$ |
| 25 | $R_3$ | $R_3$ | $R_1$ |
| 26 | $R_3$ | $R_3$ | $R_2$ |
| 27 | $R_3$ | $R_3$ | $R_3$ |

An example of a computer generated switching matrix is illustrated by pseudo code below:

```
%---------------------------------------------------------
% 3 * 3 converter (M * N) (MxC, 3 level or Vienna )
%----
M=3, %number of input lines/phases
N=3; %number of output lines/phases
% R - allowable rows of switching matrix
% note a row in S corresponds to column in FIG 2.2(a)
R(1,:)=[0 1 1]; R(2,:)=[0 1 0]; R(3,:)=[1 0 0];
%
kk=0
for i1=1:M                    % output line 1
  for i2=1:M                  % output line 2
    for i3=1:M                % output line 3
      kk=kk+1;                    % state counter
      % kk-th Switching state matrix S
      S(:,:,kk)=              [R(i1,:)
                               R(i2,:)
                               R(i3,:)]
    end
  end
end
```

Pseudo code will have number of for loops equal to the number of output lines/phases n.

By the inspection of Tables 1 and 2, it is visible that the number of valid states is #States(m*n)=$m^n$. For the 2-level 3-phase converter, the #States(2*3)=$2^3$=8, and for 3-level 3-phase converter #States(3*3)=$3^3$=27. The number of valid states corresponds to the number of state matrices available for search for the optimal voltage vector applied to the load to meet control objectives defined by a multi-objective target function. A higher number of states can provide better resolution in applied output voltage vectors; however, it will require a longer search for the optimal state, resulting in longer execution of the control algorithm.

Input voltages/potential levels in two and three level converters in FIGS. 2-4 and therefore in their common representation FIG. 5 are $V_1^i > V_2^i$ and $V_1^i > V_2^i > V_3^i$ respectively. That ensures proper biasing for transistors and diodes when they work in pairs (transistor with antiparallel diode) and such a combination can be modeled by a single bidirectional switch switches in equivalent matrix converter. Therefore, replacement of transistor-antiparallel diode pairs by a single switch can be a straightforward task and works for any multi-level converter when input voltage potentials do not change polarity. However, in the Vienna converter topology 400 of FIG. 4, the current will flow through upper or lower diodes depending on the polarity of the current of the output line. The load current flow in positive direction, indicated by the arrow marking the direction of the current in an equivalent of a single leg converter depicted as a multiple position switch 600 of FIG. 6, would cause conduction of bottom diodes connected to the negative rail in the DC link. That would correspond to the conduction of the switches connecting output lines to the bottom rail of the DC link or to the input line number 3, $V_3^i$. For negative output currents the diodes towards upper+DC bus rail or voltage level $V_1^i$ will conduct, that means that corresponding switches in MxC will conduct. These conditions can be captured by monitoring current in output lines and creating Current Polarity Switching Matrix (CPSM) as follows:

$$CPSM = \begin{bmatrix} \bar{S}_1 & 1 & S_1 \\ \bar{S}_2 & 1 & S_2 \\ \bar{S}_3 & 1 & S_3 \end{bmatrix} \quad \text{(Equation 5)}$$

$S_x = \text{sign}(I_x^0); x = 1, \ldots 3$ $S_x = 1$ if $I_x^0 > 0$, else $S_x = 0$ Multiplying element by element M×C switching matrix $$\begin{bmatrix} V_1^o \\ V_2^o \\ V_3^o \end{bmatrix} = \begin{bmatrix} S_{11} & S_{12} & S_{13} \\ S_{21} & S_{22} & S_{23} \\ S_{31} & S_{32} & S_{33} \end{bmatrix} \begin{bmatrix} V_1^i \\ V_2^i \\ V_3^i \end{bmatrix}$$

with CPSM the Vienna converter switching matrix will be created:

$$[S^V] = [S] \cdot [CPSM] = \begin{bmatrix} S_{11}\bar{S}_1 & S_{12} & S_{13}S_1 \\ S_{21}\bar{S}_2 & S_{22} & S_{23}S_2 \\ S_{31}\bar{S}_3 & S_{32} & S_{33}S_3 \end{bmatrix} \quad \text{(Equation 6)}$$

Switching matrix $S^V$ can be used in MPC of the Vienna converter in the same way for any other multi-level converter without need for code change. The only difference will be a determination of output current polarity as defined by Equation 5 and then correcting switching matrix as defined by Equation 6. The process can be extended to other multi-level converter topologies.

Model predictive control selects the switching states defined by one of the switching matrices (from the set of 8 for 2*3 converter, or set of 27 for 3*3 converter etc.) to meet control objectives defined by minimization of a multi-objective function. The objective function will typically have multiple terms that would minimize, for example, absolute value or square of error between a current reference and a predicted current, minimize a number of switching or switching frequency by minimizing the number of changes in elements of current and previous state matrix, actuation constrains, etc.:

$$g = g_1 + g_2 + g_3 + \ldots \quad \text{(Equation 7)}$$
$$= w_1[(i_q^* - i_q^p)^2 + (i_d^* - i_d^p)^2] + +$$
$$w_2[|S(k) - S(k-1)|] + +$$
$$w_3\|\bar{v}(k) - \bar{v}(k-1)\| + \ldots$$

In Equation 7, the second term with weight $w_2$ takes influence of switching frequency on the overall objective function g through counting of changes in a new and old switching matrix (e.g., a targeted switching matrix and a current switching matrix). Some of the switching states can be more preferable than the others. For example, in a 3-level T converter, switches connected to the middle of the DC link switch half of the bus voltage. Switches connected to the + and − DC link switch full bus voltage and thus create higher losses, EMI and current ripple. Therefore, it is important to be able to assign weights to individual switching states with higher weighting factors to the value that are less preferable. For that purpose, an auxiliary Switching Weight Penalty Function (SWPF) is defined as follows:

$$SWPF = \begin{bmatrix} w_{11} & w_{12} & . & w_{1m} \\ w_{21} & w_{22} & . & w_{2m} \\ . & . & . & . \\ w_{n1} & w_{n2} & & w_{nm} \end{bmatrix} \quad \text{(Equation 8)}$$

For example, the SWPF for a 3-level T type converter may have only two weights, $w_x$ to penalize switching of upper/lower devices and $w_y$ to penalize switching of the device connected to the middle of the DC link:

$$SWPF = \begin{bmatrix} w_x & w_y & w_x \\ w_x & w_y & w_x \\ w_x & w_y & w_x \end{bmatrix}$$

Where $w_x > w_y$ to penalize more heavily switching of devices connected to top and bottom rails and penalizing less devices connected to the middle rail.

The modified second term in objective function in equation 7 would then have element-by-element multiplication terms, indicated by a dot, between SWPF and the absolute value of new and old switching matrices (e.g., current switching matrix and previous switching matrix):

$$g_2 = w_2 \left[ \sum_{i=1}^{n} \sum_{j=1}^{m} |s_{i,j}(k) - s_{i,j}(k-1)| s_{i,j}^{wpf} \right] \quad \text{(Equation 9)}$$

Where $s_{i,j}^{wpf}$ is an element of the SWPF. An alternative implementation of Equation 9 relies on matrix and vector multiplications instead on adding element-by-element of the matrix, suitable for simulation and automatic code generation is as follows:

$$g_2 = w_2\{I_c^T[|S(k) - S(k-1)| \cdot SWPF]I_r\} \quad \text{(Equation 10)}$$

Where:
|S(k)−S(k−1)| is the difference between current and old switching matrices.
$I_c^T$ is a transposed unity vector with number of elements equal to number of rows of S (for 2*3 converter, matrix S has 2 columns and 3 rows, and $I_c^T = [1, 1, 1]$).
$I_r$ is unity vector with number of elements equal to number of columns of matrix S (for 2*3 converter $I_r^T = [1, 1]$).

Figure 7:
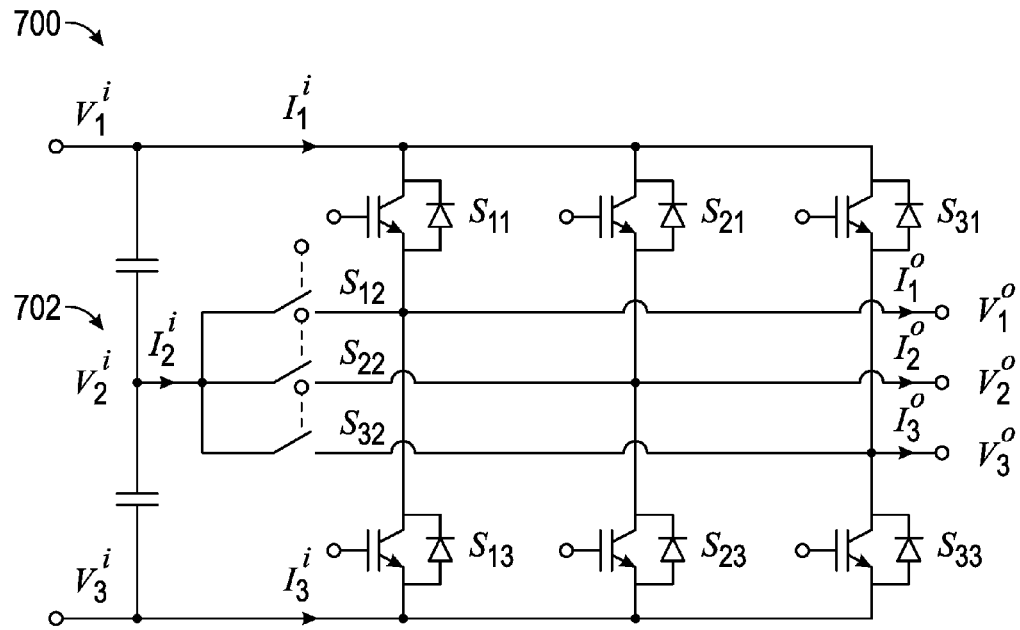
FIG. 7 depicts a three-level T power converter topology with a middle voltage level according to an embodiment.

A second voltage level $V_2^i$ of a 3-level converter can be created from the middle point of a capacitor voltage divider in a DC link as depicted in FIG. 7. FIG. 7 depicts a 3-level T topology converter 700 with a middle voltage level created from the DC link capacitor divider 702. To control the level to be in the middle—between voltage $V_1^i$ and $V_3^i$, the objective function in Equation 7 can be expanded with a term:

$$g_4 = w_4 \left( \frac{V_1^i - V_3^i}{2} - \Delta e \right)^2 \quad \text{(Equations 11a, b, c)}$$
$$V_1^i - V_3^i = V_{dc}$$
$$\Delta e = 0.5 V_{dc}^* + k_{dc\_bal} \frac{1}{2C} \int I_2^i dt$$

Where $V_{dc}^*$ is a desired DC bus voltage that sets initial condition in Equation 11c. The gain $k_{dc\_bal}$ sets the gain in a calculation correction voltage $\Delta e$ and controls the speed of the adjustment. Correction voltage $\Delta e$ can be used in an objective sub-function $g_4$ to control DC link middle voltage point. The middle point voltage can be controlled through switching function by controlling states of switches connected to the middle point and thus controlling current $I_2{}^i$. Current $I_2{}^i$ if positive decreases and if negative increases voltage on the middle point of the DC link. Current $I_2{}^i$ can be calculated using Equation 4 and known switching matrix and output currents.

Figure 8:
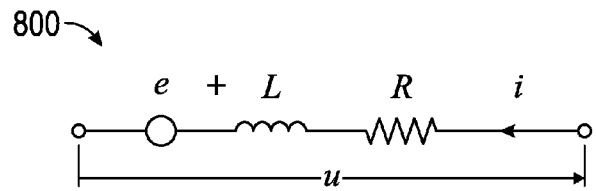
FIG. 8 depicts a resistive-inductive load according to an embodiment.
Figure 9:
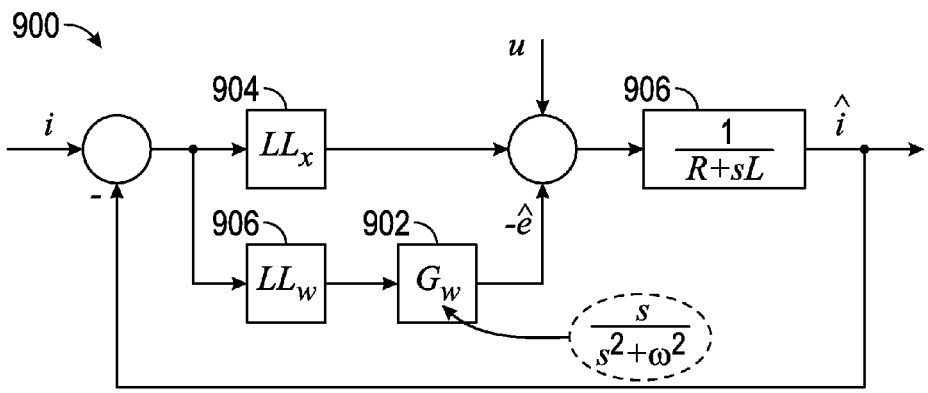
FIG. 9 depicts a block diagram of a back electromotive force observer according to an embodiment.

A typical control plant in power electronics includes a resistive-inductive (RL) load 800 as depicted in FIG. 8 and back electromotive force (emf) in individual phases, where FIG. 9 depicts a back emf observer 900 for a single phase case. As in multi-phase systems where all the phases are identical, a one-phase model case can be expanded to a multi-phase system model. In FIG. 9, i is sampled current, $\hat{i}$ is a current estimate, $\hat{e}$ is back emf estimate and u is a voltage on the load. Approximate value of the voltage u on the load 800 can be obtained by Equation 3 by multiplication of an input voltage vector with switching matrix S. Harmonic element $G_w$ 902 is tuned to resonate at the $\omega=2\pi f$ where f is a frequency of back emf e will act as a harmonic integrator. Harmonic integrator will keep on changing its output, oscillating with frequency f, until a harmonic component in error signals (between $\varepsilon=i-\hat{i}$) vanishes. $LL_x$ 904 and $LL_w$ 906 are gains in the observer correction loop.

Figure 10:
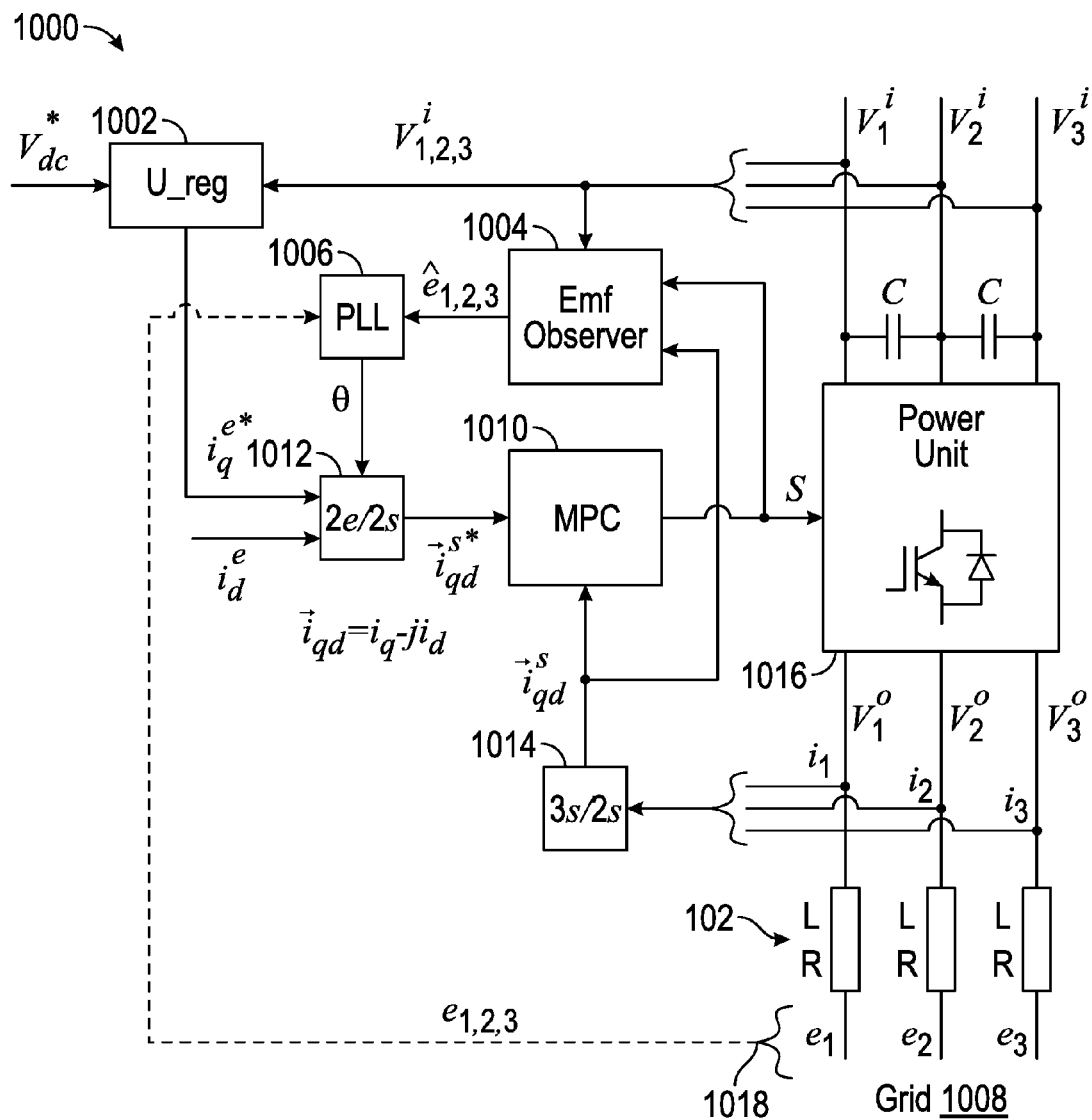
FIG. 10 depicts a block diagram of a three-level T power converter according to an embodiment.

Accuracy of back emf estimation will depend on knowledge of plant impedance parameters R and L in transfer function 906 and voltage estimate u based on switching state matrix and knowledge of input voltage vectors (Equation 3). In grid type applications, errors in knowledge of these parameters are typically small and the back emf observer 900 provides amplitude and phase alignment of estimated and real voltages. Thus, it may be suitable for estimation of grid voltages in regenerative driver and grid tied inverters (wind, solar, etc.). Back emf from back emf observer 900 can be used as an input to a phase-locked loop (PLL) system for tracking and reference angle generation instead of real sampled voltage signals as depicted in FIG. 10. Thus, the back emf observer 900 can eliminate a need for additional hardware (e.g., sensors 1018 of FIG. 10) for providing grid voltages in regenerative drives and grid tied converters.

A block diagram for the control of current of a 3-level T converter 1000 is shown in FIG. 10. A DC bus voltage regulator 1002 can provide an active—q current reference for controlling DC bus voltage. Back emf observer 1004 provides estimates of grid voltages $e_{1,2,3}$ that are input to a PLL 1006 for synchronization with a grid 1008. MPC 1010 performs current control tracking and other control objectives as defined by a multi-objective function. Converter functions 1012 and 1014 provide frame of reference conversions using conventional methods, e.g., Clark/Park transforms. The MPC 1010 can control switch states of power converter switches in multi-level power converter 1016.

The multi-level power converter 1016 can include power converter switches (S) arranged in one of the topologies described in reference to FIGS. 2-4 and 7, or another topology known in the art. The MPC 1010 is an example of a controller configured to select a current switching matrix from switching matrices that models the multi-level power converter 1016 in a current state. The MPC 1010 determines a targeted switching matrix from the switching matrices that best aligns with a targeted state based on alignment with a multi-objective function and changes with respect to the current state. The MPC 1010 adjusts a switch state of the power converter switches based on the targeted switching matrix. The MPC 1010 sets the current switching matrix to the targeted switching matrix and monitors for changes with respect to the multi-objective function and the current state.

Determining of the targeted switching matrix may include applying a switching weight penalty function (e.g., Equation 8) that assigns weighting factors based on a position of each of the power converter switches in the multi-level power converter 1016. The multi-objective function can be modified based on the switching weight penalty function and an absolute value of a difference between the current switching matrix and a previously selected switching matrix. Determining the targeted switching matrix may include balancing a mid-point electric current of the multi-objective function when the multi-level power converter 1016 is a 3-level converter. A back electromotive force observer uses a voltage estimator based on the current state of the current switching matrix to provide a back electromotive force estimate to the PLL 1006. The back emf observer 1004 may be an embodiment of the back emf observer 900 of FIG. 9 and include a harmonic integrator tuned to a frequency of a voltage to be estimated by the voltage estimator. The back emf estimate can be provided to the PLL 1006 in place of a plurality of sensed output voltages from sensors 1018, such that sensors 1018 can be eliminated. The PLL 1006 can provide phase alignment to the MPC 1010.

Figure 11:
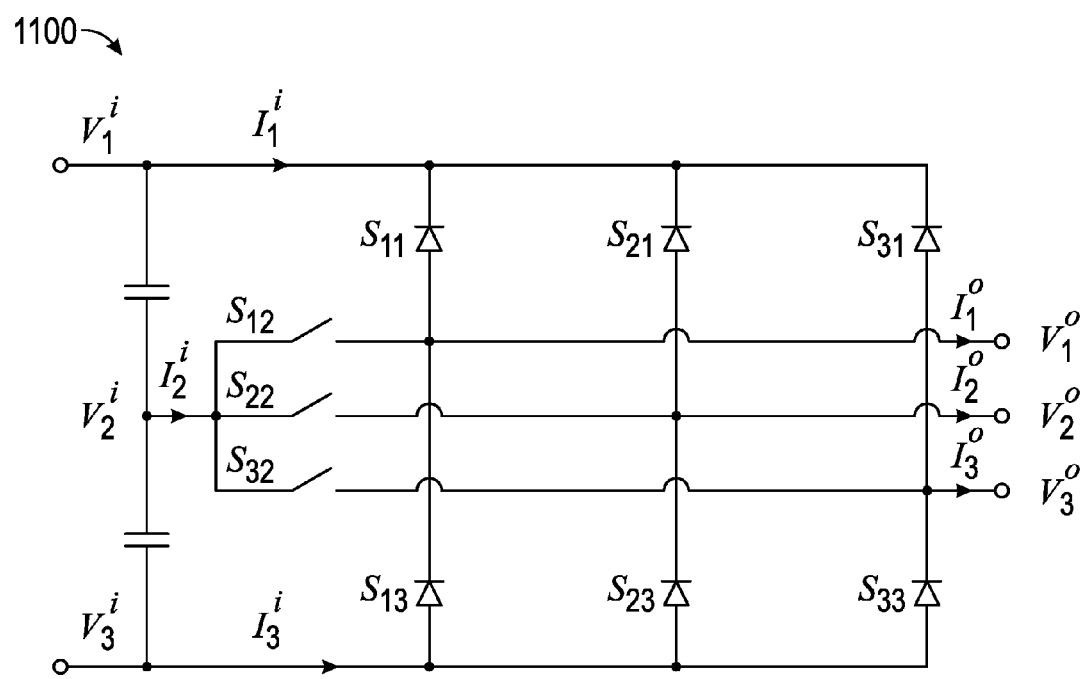
FIG. 11 depicts a power structure of a Vienna converter according to an embodiment.

Operation of a Vienna converter 1100 of FIG. 11 can be performed using a variation of the MPC 1010 of FIG. 10. In one embodiment, a multi-objective function used by MPC 1010 for Vienna converter 1100 for current tracking is as follows:

$$g = w_1 \left[ \frac{(i_q^* - i_q^p)^2}{i_q^{*2} + \varepsilon} + \frac{(i_d^* - i_d^p)^2}{i_d^{*2} + \varepsilon} \right]; \varepsilon > 0 (\varepsilon = 0.1) \quad \text{(Equation 12)}$$

Turning to FIG. 12, as illustrated, a system 1200 includes an MPC optimizing computer 1202, a power converter 1204, and input/output (I/O) devices 1206. The MPC optimizing computer 1202 may be implemented as a workstation, such as a PC or a server, or an embedded system. The MPC optimizing computer 1202 includes a memory 1210 that communicates with a processor 1208. The memory 1210 may store a switching matrix generator 1212 and/or an MPC optimizer 1214 as executable instructions that are executed by the processor 1208. The executable instructions may be stored or organized in any manner and at any level of abstraction, such as in connection with the execution of the switching matrix generator 1212 and/or MPC optimizer 1214. The processor 1208 may be any type of processor (CPU), including a single core or multicore microprocessor, a digital signal processor, a microcontroller, an application specific integrated circuit, a field programmable gate array, or the like. Also, in embodiments, memory 1210 may include random access memory (RAM), read only memory (ROM), or other electronic, optical, magnetic, or any other computer readable medium onto which is stored the switching matrix generator 1212 and/or MPC optimizer 1214 described below. The MPC optimizing computer 1202 may include a database 1216 in data communication with the processor 1208. The database 1216 may be used to store switching matrices as well as any other data and algorithms that are used to implement the switching matrix generator 1212 and/or MPC optimizer 1214.

The MPC optimizing computer 1202 may provide one or more switching matrices 1218 to the power converter 1204 based on a switching topology of the power converter 1204, as well as instructions for execution by a processing circuit 1220 of the power converter 1204 such as instructions to implement the back emf observer 1004 and MPC 1010 of FIG. 10. A user may interface with the MPC optimizing computer 1202 using one or more input/output (I/O) devices 1206. The I/O devices 1206 may include a display device or screen, audio speakers, a graphical user interface (GUI), keyboard, microphone for voice recognition, etc. In some embodiments, the I/O devices 1206 may be used to enter or adjust configuration parameters and/or a mode of operation for the switching matrix generator 1212 and/or MPC optimizer 1214.

It is to be appreciated that system 1200 is illustrative. In some embodiments, additional components or entities not shown in FIG. 12 may be included. In some embodiments, one or more of the components or entities may be optional. In some embodiments, the components or entities of system 1200 may be arranged or configured differently from what is shown in FIG. 12. For example, in some embodiments, the switching matrix generator 1212 and/or MPC optimizer 1214 may be executed by the processing circuit 1220.

The switching matrix generator 1212 can generate switching matrices for a multi-level power converter, such as power converter 1204, by determining a number of phases and levels in the multi-level power converter based on a number of input lines and output lines of the multi-level power converter. A switch position may be defined between each of the input lines and each of the output lines. A switching matrix in switching matrices 1218 for the power converter 1204 can be populated with each combination of switching state of power converter switches at each switch position that allows a maximum of one switch input leg to establish a conductive path with a single output line. The MPC optimizer 1214 can refine the switching matrices 1218 using the methods previously described herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure.

Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A model predictive control for power electronics, the model predictive control comprising:
   a plurality of switching matrices defining potential states of a plurality of power converter switches in a multi-level power converter, the multi-level power converter comprising one or more input lines and one or more output lines in power electronics connected to a load or source; and
   a control that is configured to perform:
      selecting a current switching matrix from the switching matrices that models the multi-level power converter in a current state;
      determining a targeted switching matrix from the switching matrices that best aligns with a targeted state based on alignment with a multi-objective function and changes with respect to the current state, wherein the targeted switching matrix is determined by applying a switching weight penalty function that assigns weighting factors based on a position of each of the power converter switches in the multi-level power converter;
      adjusting a switch state of the power converter switches based on the targeted switching matrix to control a voltage level between the one or more input lines and the one or more output lines of the multi-level power converter; and
      setting the current switching matrix to the targeted switching matrix and monitoring for changes with respect to the multi-objective function and the current state to meet one or more demands of the load or source.

2. The model predictive control of claim 1, wherein the switching matrices comprise a plurality of rows per switching state that define gating signal states for the power converter switches according to a power converter topology of the multi-level power converter.

3. The model predictive control of claim 1, wherein the switching matrices incorporate a current polarity switching matrix that models output current polarity for a plurality of diodes as the power converter switches when the multi-level power converter is a Vienna converter.

4. The model predictive control of claim 1, wherein the multi-objective function is modified based on the switching weight penalty function and an absolute value of a difference between the current switching matrix and a previously selected switching matrix.

5. The model predictive control of claim 1, wherein determining the targeted switching matrix further comprises balancing a mid-point electric current of the multi-objective function when the multi-level power converter is a 3-level converter.

6. The model predictive control of claim 1, wherein a back electromotive force observer uses a voltage estimator based on the current state of the current switching matrix to provide a back electromotive force estimate to a phase-locked loop of the multi-level power converter.

7. The model predictive control of claim 6, wherein the back electromotive force observer comprises a harmonic integrator tuned to a frequency of a voltage to be estimated by the voltage estimator.

8. The model predictive control of claim 6, wherein the back electromotive force estimate is provided to the phase-locked loop in place of a plurality of sensed output voltages of the multi-level power converter, and the phase-locked loop provides phase alignment to the model predictive control.

9. A method of model predictive control for power electronics, the method comprising:
   selecting, by a control, a current switching matrix from a plurality of switching matrices, wherein the current switching matrix models a multi-level power converter in a current state and the switching matrices define potential states of a plurality of power converter switches in the multi-level power converter, the multi-level power converter comprising one or more input lines and one or more output lines in power electronics connected to a load or source;
   determining, by the control, a targeted switching matrix from the switching matrices that best aligns with a targeted state based on alignment with a multi-objective function and changes with respect to the current state, wherein the targeted switching matrix is determined by applying a switching weight penalty function that assigns weighting factors based on a position of each of the power converter switches in the multi-level power converter;
   adjusting, by the control, a switch state of the power converter switches based on the targeted switching matrix to control a voltage level between the one or more input lines and the one or more output lines of the multi-level power converter; and
   setting, by the control, the current switching matrix to the targeted switching matrix and monitoring for changes with respect to the multi-objective function and the current state to meet one or more demands of the load or source.

10. The method of claim 9, wherein the switching matrices comprise a plurality of rows per switching state that define gating signal states for the power converter switches according to a power converter topology of the multi-level power converter.

11. The method of claim 9, wherein the switching matrices incorporate a current polarity switching matrix that models output current polarity for a plurality of diodes as the power converter switches when the multi-level power converter is a Vienna converter.

12. The method of claim 9, wherein the multi-objective function is modified based on the switching weight penalty function and an absolute value of a difference between the current switching matrix and a previously selected switching matrix.

13. The method of claim 9, wherein determining the targeted switching matrix further comprises balancing a mid-point electric current of the multi-objective function when the multi-level power converter is a 3-level converter.

14. The method of claim 9, wherein a back electromotive force observer uses a voltage estimator based on the current state of the current switching matrix to provide a back electromotive force estimate to a phase-locked loop of the multi-level power converter.

15. The method of claim 14, wherein the back electromotive force observer comprises a harmonic integrator tuned to a frequency of a voltage to be estimated by the voltage estimator.

16. The method of claim 14, wherein the back electromotive force estimate is provided to the phase-locked loop in place of a plurality of sensed output voltages of the multi-level power converter, and the phase-locked loop provides phase alignment to the model predictive control.

* * * * *